(12) United States Patent
Sato et al.

(10) Patent No.: US 6,692,408 B2
(45) Date of Patent: Feb. 17, 2004

(54) SHIFT CONTROL SYSTEM FOR AUTOMATIC TRANSMISSION

(75) Inventors: Osamu Sato, Fujisawa (JP); Tatsuya Imamura, Fujisawa (JP); Toshihide Fukasawa, Numazu (JP); Kazuhiro Takatori, Yokohama (JP)

(73) Assignee: JATCO Ltd, Fuji (JP)

(*) Notice: Subject to any disclaimer, the term of this patent is extended or adjusted under 35 U.S.C. 154(b) by 0 days.

(21) Appl. No.: 10/244,057

(22) Filed: Sep. 13, 2002

(65) Prior Publication Data

US 2003/0060329 A1 Mar. 27, 2003

(30) Foreign Application Priority Data

Sep. 25, 2001 (JP) .......................................... 2001-290561

(51) Int. Cl.$^7$ ............................................. F16H 61/10
(52) U.S. Cl. .......................................... 477/129; 74/335
(58) Field of Search .................................. 477/128, 129; 475/132; 74/335

(56) References Cited

U.S. PATENT DOCUMENTS 5,591,102 A * 1/1997 White et al. ................ 477/107
6,319,171 B1 * 11/2001 Hughes et al. ............... 477/111

FOREIGN PATENT DOCUMENTS

JP          06-323418          11/1994

* cited by examiner

Primary Examiner—Dirk Wright
(74) Attorney, Agent, or Firm—Klarquist Sparkman LLP

(57) ABSTRACT

A shift control system for an automatic transmission having an automatic shift mode in which a proper gear ratio is automatically selected according to a shift command based on a throttle valve opening and a vehicle speed, and further having a manual shift mode in which a gear ratio is selected according to a shift command given by driver's manual operation. The shift control system includes timer means for counting an elapsed time after a shift operation has been started. The elapsed time is compared with a predetermined first re-shift permission time in the case of automatic shift operation and with a predetermined second re-shift permission time in the case of manual shift operation. The first re-shift permission time and the second re-shift permission time are different from each other to optimize the shift control both in the automatic shift mode and in the manual shift mode.

5 Claims, 5 Drawing Sheets

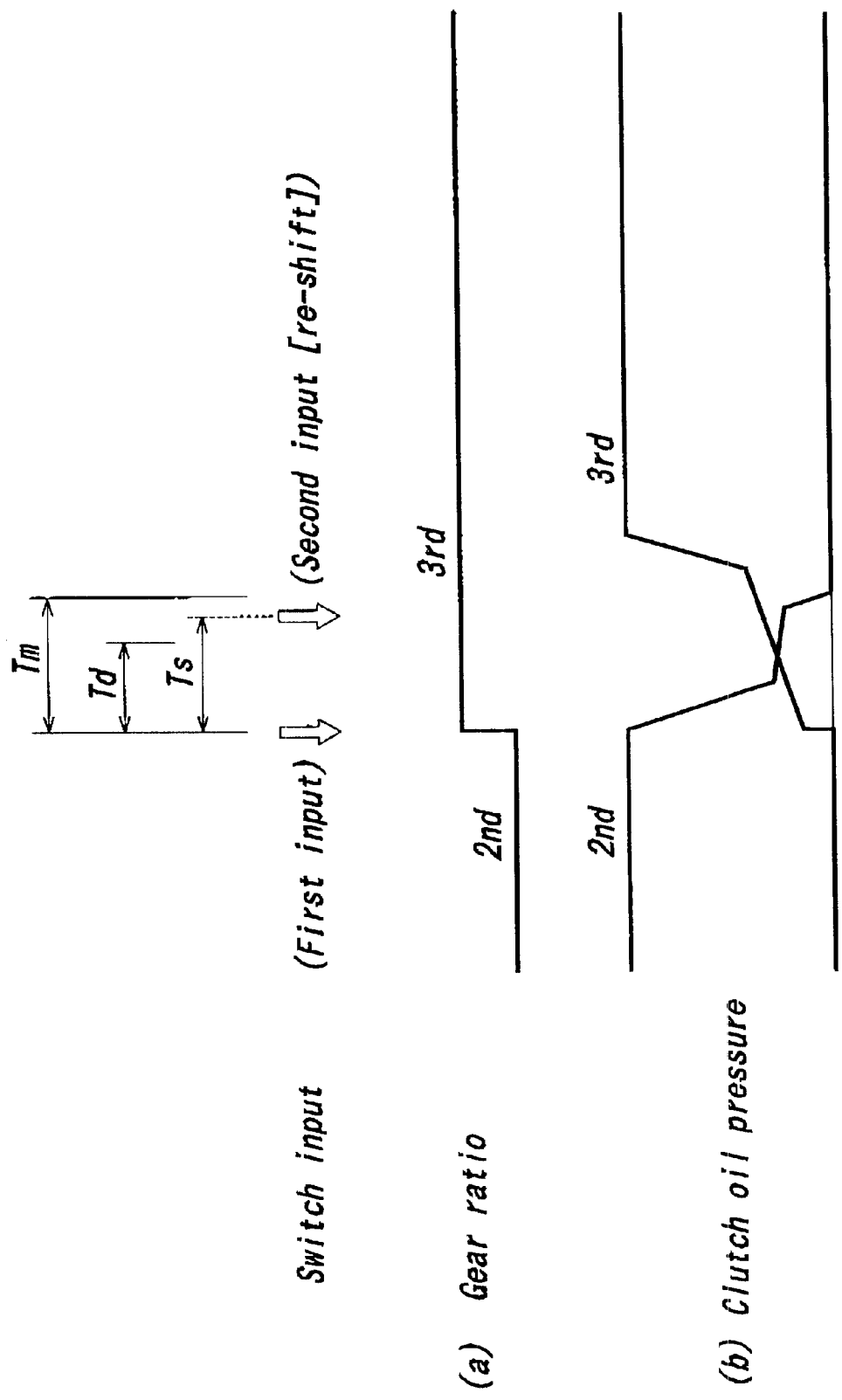

SHIFT CONTROL SYSTEM FOR AUTOMATIC TRANSMISSION

BACKGROUND OF THE INVENTION

1. Field of the Invention

The present invention relates to a shift control system for an automatic transmission that can be operated not only under an automatic shift mode, but also under a manual shift mode.

2. Description of Related Art

Such an automatic transmission is highly suitable for various purposes ranging from ordinary use to sporty use, since a proper gear ratio can be selected not only automatically according to a shift command based on a throttle valve opening and a vehicle speed, but also manually according to a shift command given by driver's manual operation in a fun-to-drive manner. Prior attempts at this type of automatic transmission suffer from a problem that multiple shift commands may be successively given within a short period causing noticeable shift shocks and thereby degrading driving comfort. Thus, in an attempt to mitigate shift shocks and/or avoid degradation of the driving comfort, a shift control system is proposed in JP 6-323418A, which includes a system designed such that, during a shift operation corresponding to input of a shift command, a further shift operation based on a subsequent shift command is prohibited when a predetermined time or so-called "re-shift permission time" has elapsed. However, even if the intended objectives can be more or less achieved by such a conventional solution, there still remains a problem often felt by many drivers, that a satisfactory response to shift command is not achieved particularly in the manual shift mode wherein an immediate reaction of the transmission is desired after a shift command is manually given.

SUMMARY OF THE INVENTION

It is therefore a primary object of the present invention to provide an improved shift control system for an automatic transmission having an automatic shift mode and a manual shift mode, wherein the shift control system is so designed as to achieve a sufficient response to shift command in the manual shift mode, while mitigating shift shocks and/or avoiding degradation of the driving comfort.

The inventors conducted thorough research and investigations and arrived at a recognition that the above-mentioned problems of the prior art resulted from the design of the shift control system in which the length of the re-shift permission time for automatic shift operation and that for manual shift operation are the same. In other words, it has been conceived by the inventors that the shift control, both in the automatic shift mode and the manual shift mode, can be optimized if different re-shift permission times are set for these two shift modes.

According to the present invention, there is provided a shift control system for an automatic transmission having an automatic shift mode in which a proper gear ratio is automatically selected according to a shift command based on a throttle valve opening and a vehicle speed, and further having a manual shift mode in which a gear ratio is selected according to a shift command given by driver's manual operation, wherein the shift control system comprises timer means for counting an elapsed time after a shift operation has been started, which elapsed time is compared with a predetermined first re-shift permission time in the case of automatic shift operation and with a predetermined second re-shift permission time in the case of manual shift operation, wherein the first re-shift permission time and the second re-shift permission time are different from each other.

In the shift control system according to the present invention, an elapsed time after a shift operation has been started is counted by a timer means and compared with a predetermined first re-shift permission time in the case of automatic shift operation and with a predetermined second re-shift permission time in the case of manual shift operation, wherein the first re-shift permission time and the second re-shift permission time are different from each other. Therefore, it is possible to perform the shift control in optimized manner both in the automatic shift mode and the manual shift mode.

It is preferred that the second re-shift permission time is set to be longer than the second re-shift permission time. In this instance, it is possible to perform the shift control, by giving priority to avoidance of shift shocks and/or degraded driving comfort, in the case of automatic shift mode, and further giving priority to response to a shift command in the case of the manual shift mode.

It is preferred that the manual shift mode of the automatic transmission enables an upshift of one step of the gear ratios by one manual operation and a downshift of one step of the gear ratios by one manual operation. In this instance, even when the driver in the manual shift mode of the transmission successively gives multiple commands for upshift and/or downshift operations within a short time, the shift operation exactly to a gear ratio as intended by the driver can be performed with a satisfactory response.

BRIEF DESCRIPTION OF THE DRAWINGS

The present invention will be further explained below with reference to preferred embodiments shown in the accompanying drawings.

FIG. 6 is a graph showing one example of the relationship between the elapsed time of the shift operation in automatic transmission and re-shift permission time in which a re-shift command is given during the shift operation.

DETAILED DESCRIPTION OF THE PREFERRED EMBODIMENT

Figure 1:
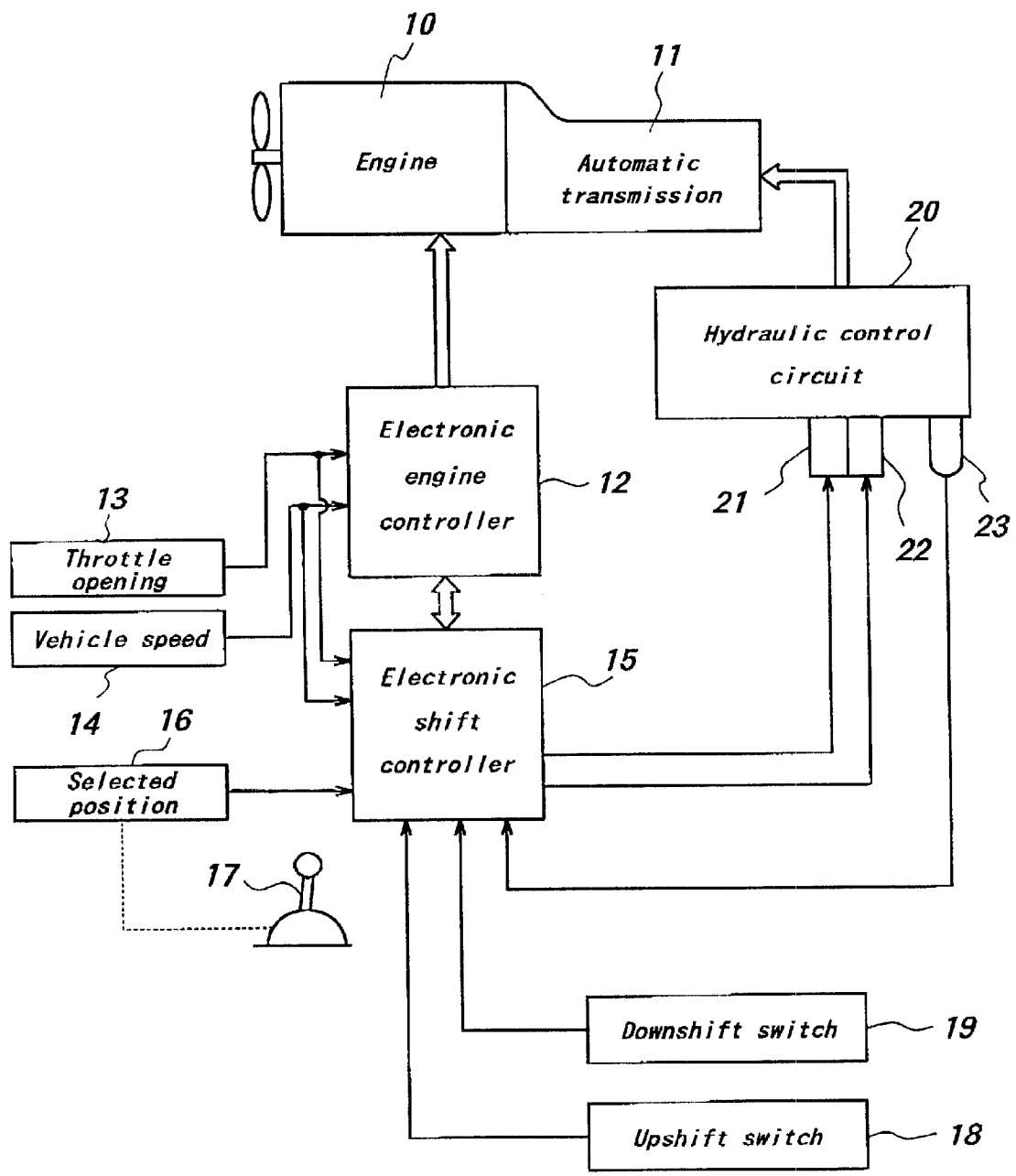
FIG. 1 is a block diagram schematically showing a shift control system according to the present invention.

As shown in FIG. 1, an engine 10 of a vehicle is drivingly connected to an automatic transmission 11 that is controlled by a shift control system according to the present invention. It is assumed that an electronic engine controller 12 carries out an engine control, such as fuel injection valve control and ignition control, according to the throttle opening detected by a throttle opening sensor 13 and the vehicle speed detected by a vehicle speed sensor 14.

An electronic shift controller 15 determines a proper gear ratio according to the throttle opening and the vehicle speed, as well as the position of a selector 17 detected by a selected position sensor 16, and an upshift signal from an upshift switch 18 or a downshift signal from a downshift switch 19. Based on these parameters, the electronic shift controller 15 determines a gear ratio of the automatic transmission 11 and generates command values for realizing the determined gear ratio to a hydraulic control circuit 20.

The hydraulic control circuit 20 includes shift solenoids 21 and 22, which are supplied with the command values from the electronic shift controller 15, so as to operate friction elements of the automatic transmission 11, such as clutches or brakes, for achieving the gear ratio determined by the electronic shift controller 15. The hydraulic control circuit 20 is provided with an oil temperature sensor 23 for detecting the temperature of hydraulic oil and sends a detected value to the electronic shift controller 15. It is noted that only two shift solenoids are shown in FIG. 1, for the sake of simplicity, though the number of the shift solenoids corresponds to the number of actuators for actuating the friction elements of the automatic transmission 11 to be selectively operated.

Figure 2:
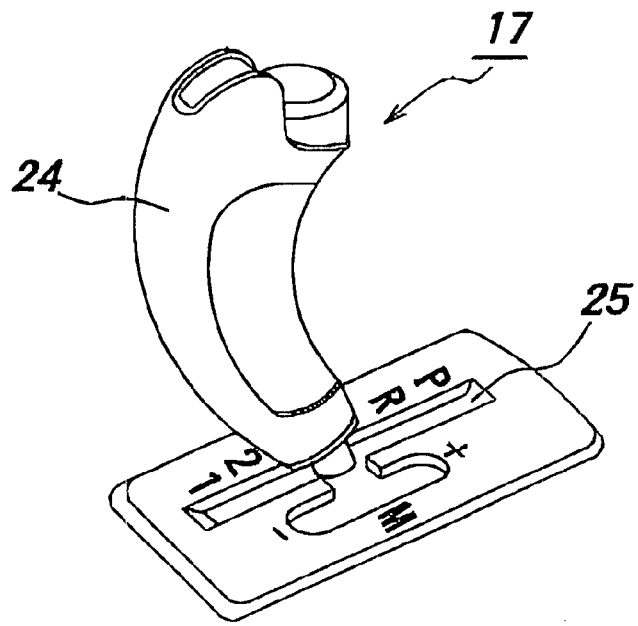
FIG. 2 is a view showing one example of a selector for the automatic transmission.

FIG. 2 shows one example of a selector 17 of the automatic transmission 11, which can be operated in both an automatic shift mode and a manual shift mode. As in a conventional manners the automatic shift mode allows upshift and downshift operations to be automatically performed based on the above-mentioned parameters of the automatic transmission 11, whereas the manual shift mode allows driver's manual upshift or downshift operations. The selector 17 shown in FIG. 2 comprises a select lever 24 that is guided by a substantially H-shaped guide grooves 25. The left side of the guide groove 25 is assigned to various ranges of the automatic transmission 11 such as parking range "P", reverse range "R", neutral range "N", drive range "D", second range "2" and first range "1" wherein the drive range corresponds to the automatic shift mode. Although the "N" and "D" range designations are hidden in FIG. 2 by the shift selector, it should be understood that the "N" range is adjacent the "R" position and the "D" range is adjacent the "2" position.

The position of the select lever 24 for the manual shift mode of the automatic transmission 11 is situated opposite to, or adjacent, the drive range position as shown in FIG. 1. The manual shift mode of the automatic transmission 11 is selected simply by tilting the select lever 24 from its drive range position as illustrated toward the right side of the guide groove 25. When the select lever 24 is tilted to the right side of the guide groove 25, it is normally maintained in its center position with an indication of symbol "M". The right side of the guide groove 25 has a front end with an indication of symbol "+", where the select lever 24 operates the upshift switch 18, and a rear end with an indication of symbol "−", where the select lever 24 operates the downshift switch 19. Thus, if the select lever 24 is shifted forward in the manual shift mode, the upshift switch 18 is operated and an upshift signal is sent to the electronic shift controller 15. If the select lever 24 is shifted rearward in the manual shift mode, the downshift switch 19 is operated and a downshift signal is sent to the electronic shift controller 15. It is assumed that the electronic shift controller 15 is designed so that an upshift operation of one gear ratio is judged to have been desired by each manual operation of the select lever 24 to its forward end, and a downshift operation of one gear ratio is judged to have been desired by each manual operation of the select lever to its rear end.

Figure 3:
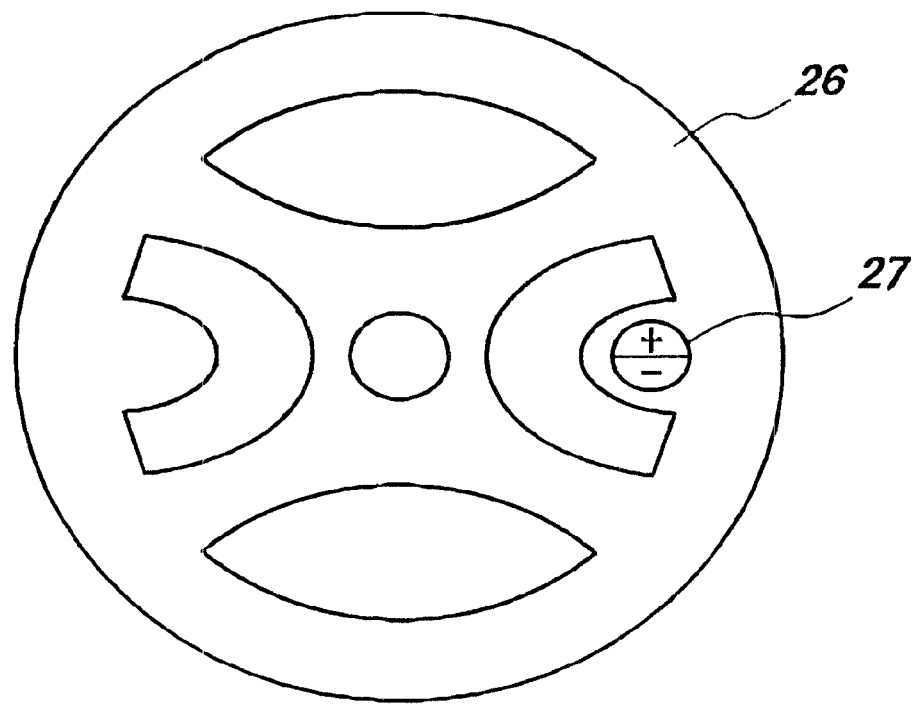
FIG. 3 is a view showing another example of an upshift/downshift switch.
Figure 4:
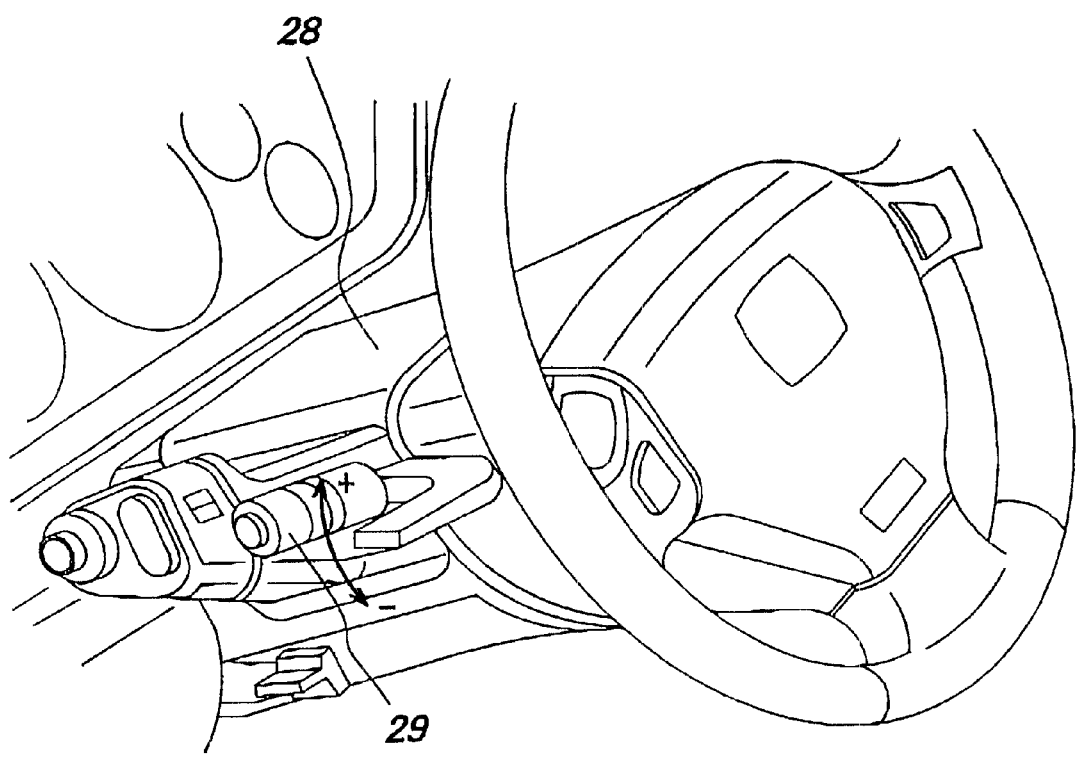
FIG. 4 is a view showing still another example of an upshift/downshift switch.

In the embodiment of FIG. 2, the upshift switch 18 and the downshift switch 19 shown in FIG. 1 are operated by the selector 24 of the automatic transmission 11, though other embodiments of the upshift switch and the downshift switch are possible. Thus, in the embodiment of FIG. 3, a steering wheel 26 is provided with a switch member 27 having upper and lower parts. If the upper part of the switch 27 is pressed by the driver, the upshift switch 18 is operated, whereas if the lower part of the switch 27 is pressed by the driver, the downshift switch 19 is operated. Furthermore, in the embodiment of FIG. 4, a steering column 28 is provided with a shift switch lever 29. If the switch lever 29 is raised upward, the upshift switch 18 is operated, whereas if the switch lever 29 is pressed downward, the downshift switch 19 is operated.

Figure 5:
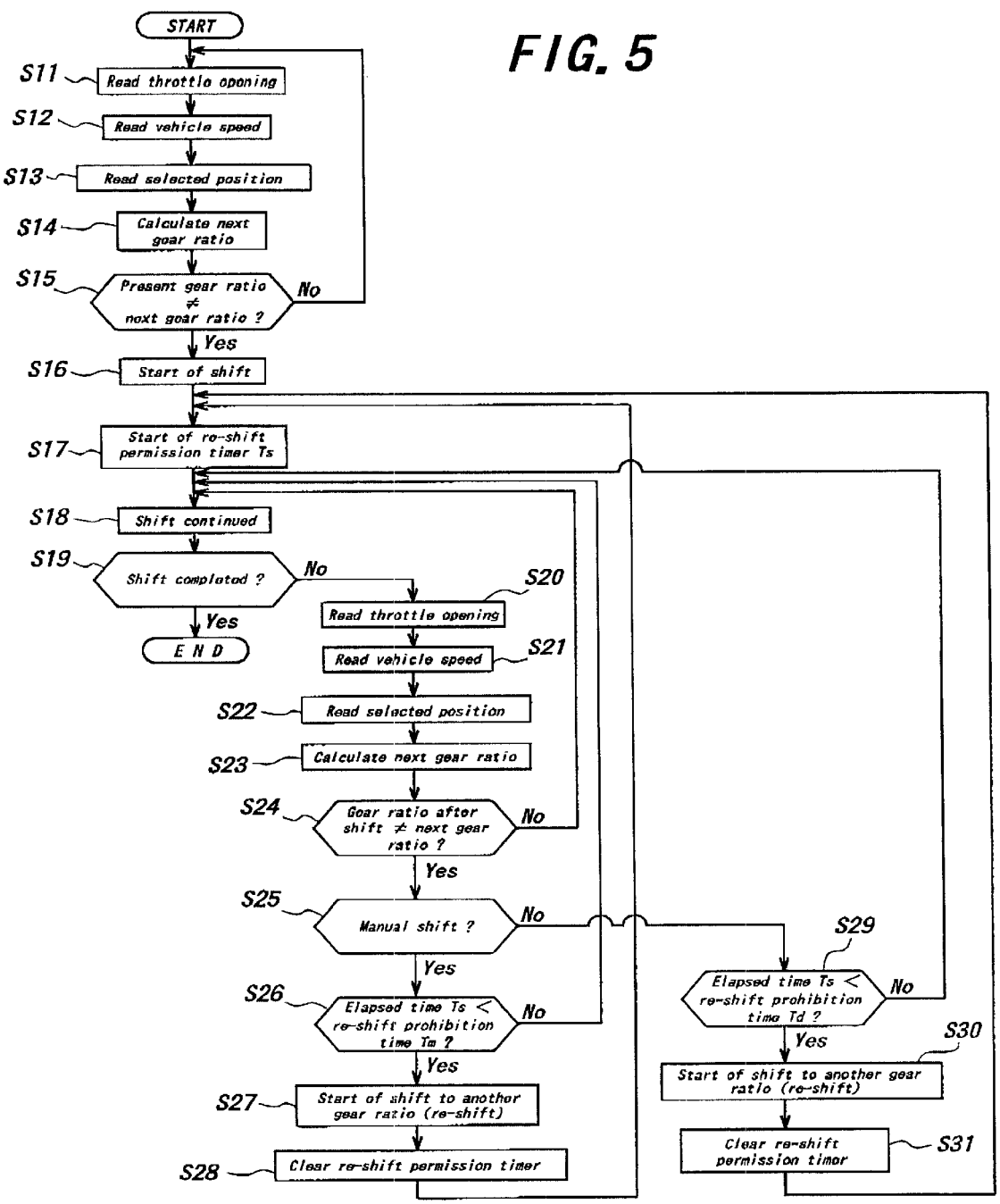
FIG. 5 is a flowchart showing a shift control program executed by the shift control system according to the present invention.

A shift control program executed by the shift control system according to the present invention will be explained below with reference to FIG. 5.

First, the throttle opening of the engine is read in step S11 from the throttle opening sensor 13, and the vehicle speed is read in step S12 from the vehicle speed sensor 14. Then, the control proceeds to step S13 where the selected range position of the automatic transmission 11 is read. To be more specific, in step S13, if the automatic shift mode is selected, the current gear ratio of the transmission is read, whereas if the manual shift mode is selected, the upshift signal from the upshift switch 18 or the downshift signal from the downshift switch 19 is read.

The control proceeds to step S14 where a next gear ratio to be achieved by a subsequent shift operation is determined based on the throttle opening, vehicle speed, and upshift or downshift signal. The control then proceeds to step S15 where the current gear ratio read in step S13 and the next gear ratio determined in step S14 are compared with each other. If the current gear ratio and the next gear ratio are different from each other, it is judged that a shift operation is required so that the control proceeds to step S16. If the current gear ratio and the next gear ratio are same as each other, it is judged that a shift operation is not required so that the control returns to step S11.

In step S16, the shift operation is started by supplying command values from the electronic shift controller 15 to the shift solenoids 21 and 22 of the hydraulic control circuit 20 so as to change the current gear ratio to a new gear ratio. The control then proceeds to step S17 where the counting of a re-shift permission timer Ts is started, so as to count the time elapsed after the shift operation is started, as the basis for a subsequent judgment of whether or not the elapsed time has reached the predetermined re-shift permission time.

As explained above, in automatic transmissions, when a new shift command is given during the period wherein the shift operation is being performed, a significant shift shock or other troubles may occur if the shift operation being performed is stopped and a new shift operation is performed immediately. In view of such a problem, as proposed in JP 6-323418A, it is known to provide a re-shift permission timer and prohibit a shift operation based on a new shift command, after a predetermined re-shift permission time as counted from the start of the previous shift operation has elasped.

The shift control according to the present invention proceeds to step S18 where the shift operation is executed and continued based on the shift command, and further to step S19 where it is judged whether or not the shift operation has been completed. If it is judged in step S19 that the shift operation has been completed, then the control program is ended. On the contrary, if it is judged in step S19 that the shift operation has not been completed, the control further proceeds successively to steps S20, S21 and S22. Thus, the throttle opening is read again in step S20 from the throttle opening sensor 13, the vehicle speed is read in step S21 from the vehicle speed sensor 14, and the selected range position of the automatic transmission 11 is read again in step S22.

The control proceeds to step S23 where the next gear ratio is newly determined based on the information read in the preceding steps S20 to S22. The control then proceeds to step S24 where the gear ratio achieved after the current shift operation and the next gear ratio determined in the preceding step S23 are compared to each other. If it is judged in step S24 that the gear ratio achieved after the current shift operation and the next gear ratio determined in the preceding step S23 are same with each other, it is judged that a new shift operation is not performed, and the control returns to step S18 to continue the shift operation being currently performed. On the contrary, it is judged in step S24 that the gear ratio achieved after the current shift operation and the next gear ratio determined in the preceding step S23 are different from each other, it is judged that a new shift operation is performed and the control proceeds to step S25.

In step S25, it is judged whether or not the shift command is given in a manual shift mode of the transmission. The judgment in step S25 may be based on information, e.g., from the selected position sensor 16 and/or an upshift signal from the upshift switch 18 or a downshift signal from the downshift switch 19. If it is judged in step S25 that the shift command is given in the manual shift mode of the transmission, the control proceeds to step S26. On the contrary, if it is judged in step 25 that the shift command is not in the manual shift mode, that is, it is in the automatic shift mode of the transmission, the control proceeds to step S29.

In step S26, the counted value Ts of the re-shift permission timer, i.e., the elapsed time from the start of the first shift operation is compared with a predetermined re-shift permission time Tm. If it is judged in step S26 that the elapsed time Ts from the start of shift operation is shorter than the re-shift permission time Tm, i.e., the elapsed time Ts is still within the re-shift permission time Tm, it is judged that the re-shift is permitted and the control proceeds to step S27. On the other hand, if the elapsed time Ts is equal to, or longer than the re-shift permission time Tm, i.e., the elapsed time Ts is beyond the re-shift permission time Tm, it is judged that the manual re-shift is prohibited and the control returns to step S18.

In step S27, a shift operation to a next gear ratio is started based on a new shift command in the manual shift mode of the transmission. The control proceeds to step S28 where the counted value of the re-shift permission timer is cleared to zero, and then the control returns to step S17.

In step S29, the counted value Ts of the re-shift permission timer Ts from the start of shift operation is compared with a another predetermined re-shift permission time Td in the automatic shift mode. If it is judged in step S29 that the elapsed time Ts is shorter than the re-shift permission time Td, i.e., the elapsed time Ts is still within the re-shift permission time Td, it is judged that the re-shift is permitted so that the control goes to step S30. On the contrary, it is judged in step S29 that the elapsed time Ts is equal to, or longer than the re-shift permission time Td, i.e., the elapsed time Ts is beyond the re-shift permission time Td, it is judged that the automatic re-shift is prohibited so that the control returns to step S18.

In step S30, an automatic re-shift to a next gear ratio is started based on the new shift command. The control then proceeds to step S31 where the counted value of the re-shift permission timer is cleared to zero, and the control then returns to step S17.

One example of the relationship between the elapsed time Ts after the shift operation in the automatic transmission 11 has been started and the re-shift permission time is shown in FIG. 6, where a re-shift command is given during the shift operation for the previous command. It is assumed that the shift operation is to be performed from the second gear ratio to the third gear ratio. Furthermore, the progress of the shift operation is indicated as a change in the clutch oil pressure.

As shown in FIG. 6, if a first shift command to the third gear ratio is given when the current gear ration is the second gear ratio, the elapsed time is counted by the re-shift permission timer Ts from the very instant when the shift command is given. The oil pressure of the clutch in engaged state for achieving the second gear ratio decreases, while the oil pressure of the clutch to be engaged for achieving the third gear ratio increases.

Here, if a second shift command, i.e., a re-shift command is given during the shift operation, the elapsed time Ts as from the first shift command is compared with the re-shift permission time Tm or Td. In FIG. 6, the elapsed time Ts is longer than the re-shift permission time Td, but shorter than the re-shift permission time Tm. Therefore, if the re-shift command is given during the shift operation from the second gear ratio to the third gear ratio is a shift command in the automatic shift mode of the transmission, the re-shift is prohibited because the re-shift permission time Td has already elapsed. On the other hand, if the re-shift command is given in the manual shift mode of the transmission, the manual re-shift is permitted because the elapsed time Ts is still within the re-shift permission time Tm. This means that priority is given in the automatic shift mode of the transmission to prevent generation of shift shock by completing one shift operation before a successive shift operation is started, whereas priority is given in the manual shift operation of the transmission to quick response to manual re-shift inputs as promptly as possible so as to accurately and timely satisfy the driver's demand.

It will be appreciated from the foregoing description that, in the shift control system according to the present invention, the elapsed time after a shift operation has been started is counted by a re-shift permission timer and compared with a predetermined first re-shift permission time in the case of automatic shift operation and a predetermined second re-shift permission time in the case of manual shift operation, wherein the first re-shift permission time and the second re-shift permission time are different from each other. Therefore, it is possible to perform the shift control in optimized manner both in the automatic shift mode and the manual shift mode.

While the present invention has been described above with reference to specific embodiment shown in the accompanying drawings, it has been presented for illustrative purpose only, and various changes or modifications may be made without departing from the scope of the invention as defined by the appended claims. Thus, for example, the present invention may be applied to a belt-type continuously variable transmission.

What is claimed is:

1. A shift control system for an automatic transmission having an automatic shift mode in which a proper gear ratio is automatically selected according to a shift command based on a throttle valve opening and a vehicle speed, and further having a manual shift mode in which a gear ratio is selected according to a shift command given by driver's manual operation, said shift control system comprising timer means for counting an elapsed time after a shift operation has been started, said elapsed time being compared with a predetermined first re-shift permission time in the case of automatic shift operation and with a predetermined second re-shift permission time in the case of manual shift operation, said first re-shift permission time and said second re-shift permission time being different from each other.

2. The shift control system according to claim 1, wherein said second re-shift permission time is set to be longer than said first re-shift permission time.

3. The shift control system according to claim 1, wherein said manual shift mode of the automatic transmission enables an upshift of one step of the gear ratios by one manual operation and a downshift of one step of the gear ratios by one manual operation.

4. A shift control system for an automatic transmission having an automatic shift mode in which a proper gear ratio is automatically selected according to a shift command based on a throttle valve opening and a vehicle speed, and further having a manual shift mode in which a gear ratio is selected according to a shift command given by driver's manual operation, said shift control system comprising timer means for counting an elapsed time after a shift operation has been started, said elapsed time being compared with a predetermined first re-shift permission time in the case of automatic shift operation and with a predetermined second re-shift permission time in the case of manual shift operation, wherein said second re-shift permission prohibition time is set to be longer than said first re-shift permission time.

5. The shift control system according to claim 4, wherein said manual shift mode of the automatic transmission enables an upshift of one step of the gear ratios by one manual operation and a downshift of one step of the gear ratios by one manual operation.

\* \* \* \* \*